Patented Apr. 26, 1932

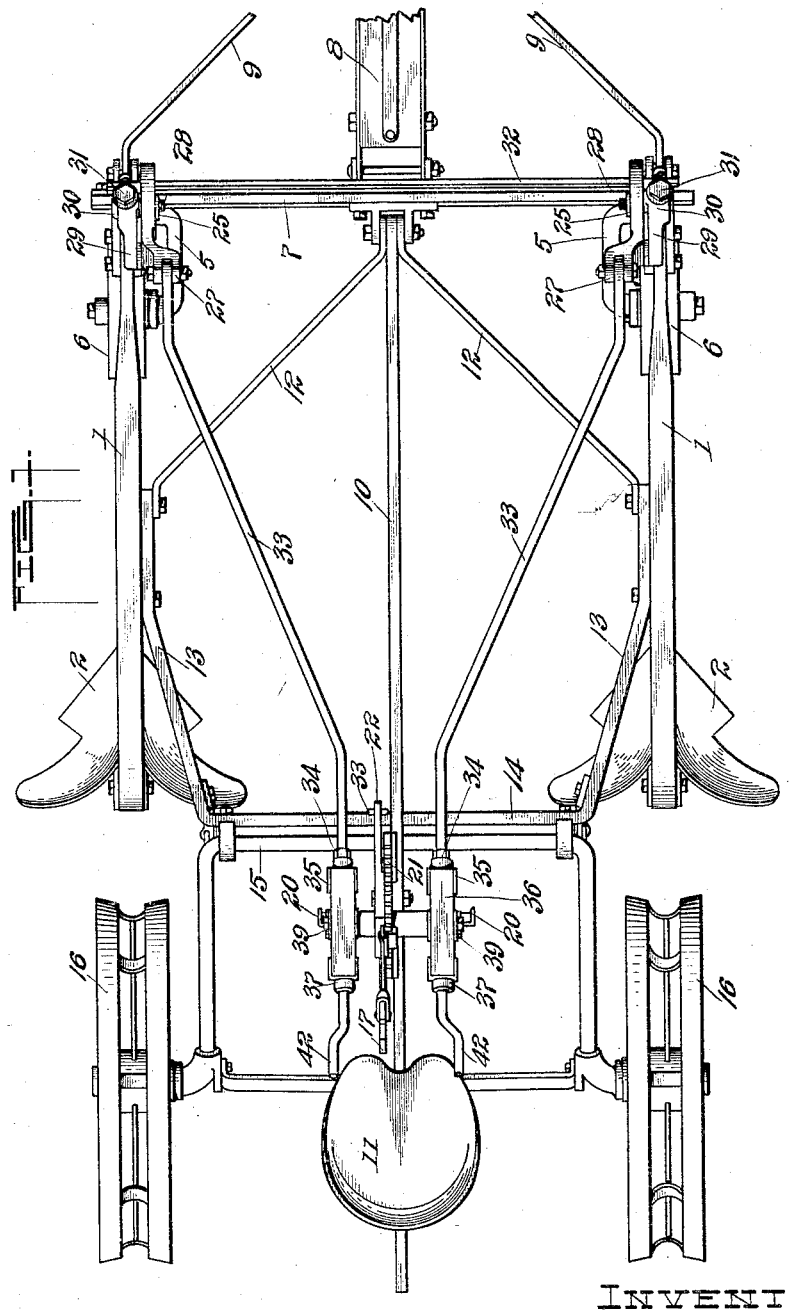

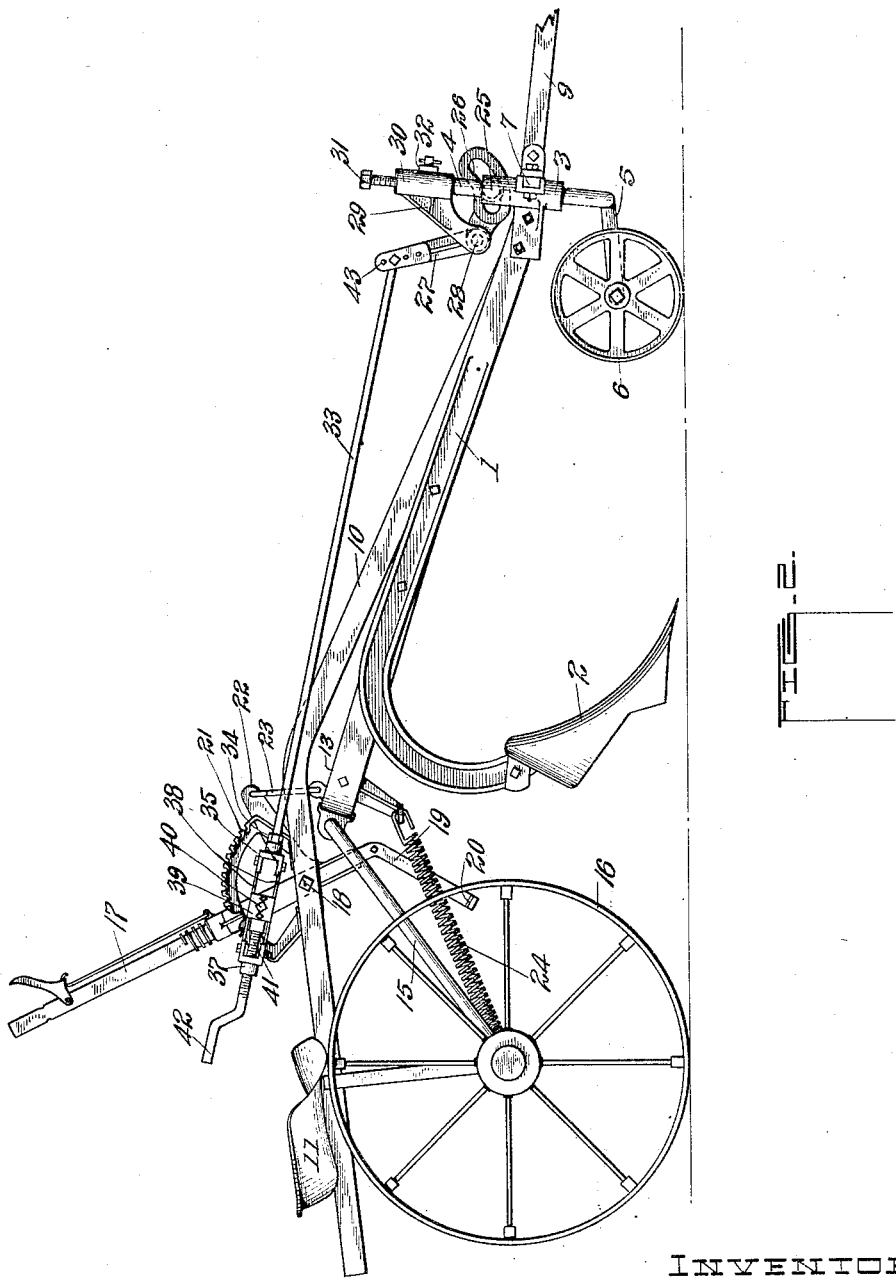

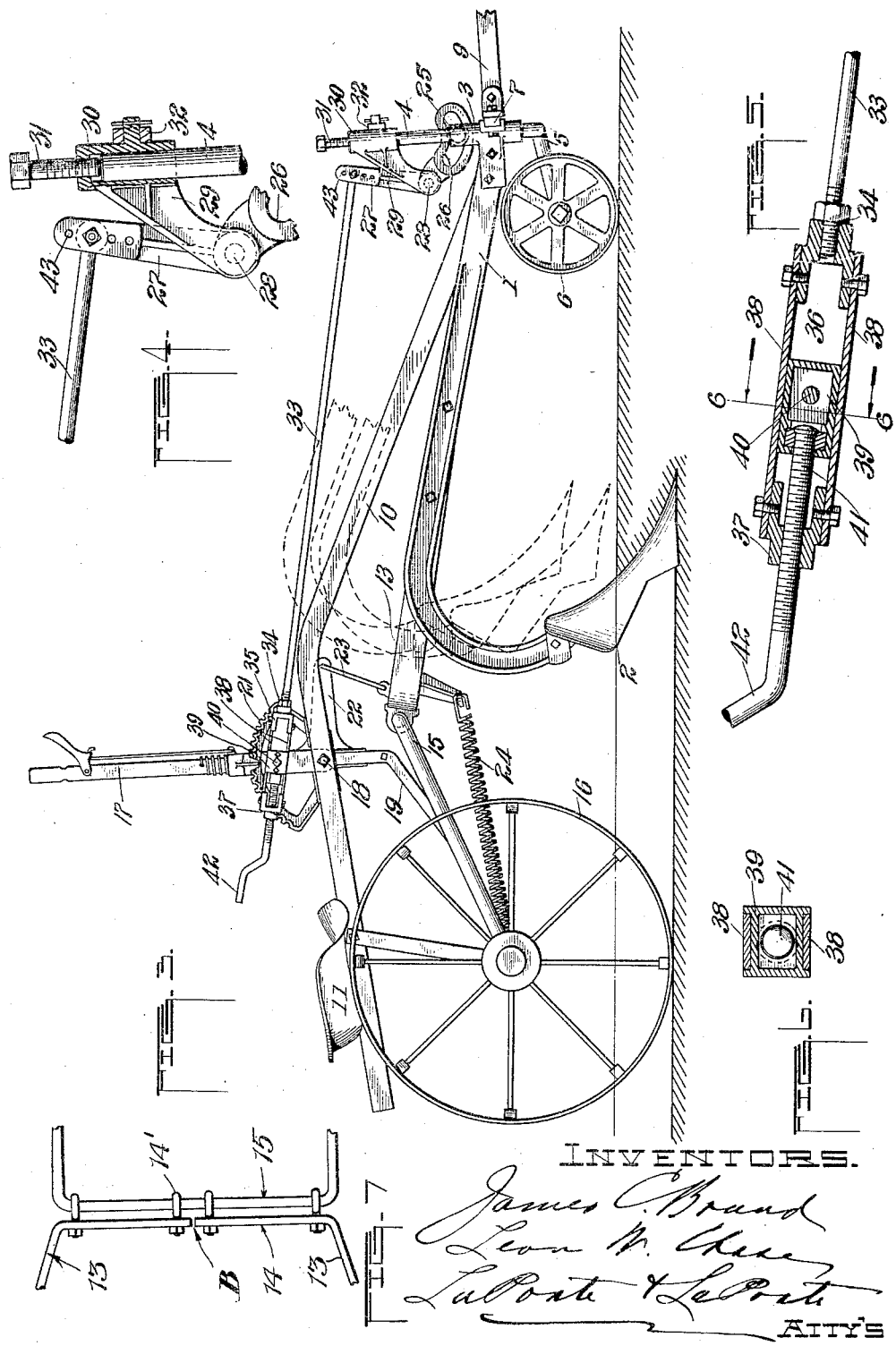

1,855,439

UNITED STATES PATENT OFFICE

JAMES C. BRAND AND LEON W. CHASE, OF LINCOLN, NEBRASKA, ASSIGNORS TO CHASE PLOW COMPANY, OF LINCOLN, NEBRASKA, A CORPORATION OF NEBRASKA

TWO-ROW LISTER

Application filed September 13, 1926. Serial No. 135,021.

This invention has reference to agricultural implements and particularly to new and useful improvements in two-row listers.

Listers of the type, to which the invention herein relates, are best illustrated in the patents to Tinsman No. 1,317,739; Chase et al. No. 1,469,751 and Chase et al. No. 1,469,752. Such listers comprise wheeled frames and include a pair of spaced plow beams and plow shares with means for raising and lowering such beams.

It is an object of the present invention to provide a sensitive and yet positive adjustment for each share, or lister bottom, for regulating their depth when operating the lister in the field; such adjusting means being associated with the lifting lever mechanism and providing for the raising and lowering of the plow beams independently of each other from the driver's seat while the machine is in operation in the field, and within as small an amount as the operator desires. The arrangement of the mechanism being such that the shares or bottoms may be raised materially higher from the ground that heretofore and lifted relatively easier and the shares or bottoms held in the same position with relation to suction when they are working in the ground.

The invention has for a further object to provide in a two-row lister a lifting mechanism for the shares or bottoms, including means for adjusting the shares vertically and independently in their relation to each other when the machine is in motion; and in the provision of other adjusting means at the front ends of the beams, by which the depth of each share or bottom may be separately regulated, but which is not usable when the machine is in operation.

It is a further object of the improved raising and lowering mechanism to make it possible to raise the shares or bottoms approximately straight or substantially vertically, and to change the suction—i. e. the angle the shares or bottoms take, in their relation to the ground, while the machine is in motion, and as a result of such straight or substantially vertical raising of the shares or bottoms to retain the same in relatively similar positions to the horizontal surface of the ground, when out, as when in the ground.

Other and additional objects of the invention will appear hereinafter.

That the invention may be more fully understood, reference is had to the accompanying drawings, forming a part of this description, illustrating a preferred embodiment of the invention, in which:—

Fig. 1 is a plan view of a two-row lister embodying the invention herein;

Fig. 2 is a side elevation of the machine with the plow beams raised only sufficiently to elevate the shares or bottoms above the surface of the ground;

Fig. 3 is a side elevation, somewhat similar to Fig. 2, except that the plow beams have been lowered with the shares or bottoms assuming approximately their working position in the ground; the dotted portion of the beam and share or bottom corresponding to the full line position in Fig. 2, and the dotted portion of the portion of the share or beam showing the approximate position the same may be raised above the ground, and the several positions of the shares further illustrating the substantial straight up and down or vertical movement of the shares or bottoms when raised or lowered and how they retain their same positions in relation to the horizontal surface of the ground, when out, as when in the ground;

Fig. 4 is a detail in elevation, partly in section, showing the adjusting means for the front ends of the beams;

Fig. 5 is a longitudinal sectional view of the adjusting means for the separate beams, at the lifting lever;

Fig. 6 is a cross-section in the adjusting means, as the same would appear if taken on the line 6—6, Fig. 5;

Fig. 7 is a detail view of the manner of mounting the rear ends of the plow beams to permit the above described independent movement thereof.

Like characters of reference denote corresponding parts throughout the figures.

The plow beams 1 which are supported in parallel spaced relation carry the shares or bottoms 2 at their rear ends and at their front ends are connected to vertically movable castings 3 slidably carried by vertical stems 4 of caster-axles 5 on which are journaled the caster-like wheels 6. A tie-bar 7 has connection at its opposite ends with these castings 3 and pivotally connected with said bar and extending forward therefrom is a draft-tongue 8 having the usual brace-rods 9. Pivotally connected centrally of and extending rearwardly from said bar is an arched beam 10 supporting a seat 11 at or near its rear end. The beam 10 and the bar 7 constitute a main frame. Also pivotally connected with the forward end of said beam 10 and bar 7 are diverging brace rods 12 which connect at their rear ends with diverging front portions 13 of bars 14, the latter being connected to the plow beams 1, see Fig. 1. 15 designates a crank-axle having a pivotal relation with the bars 14 and on opposite ends of said axle are journaled the rear wheels 16. The rear ends of the bars 14 are extended upwardly to lie parallel to crank axle 15, and are spaced as shown at B, and are pivotally connected to the axle in any suitable manner, such as for example by clips 14′.

The lifting mechanism for raising and lowering the beams 1, includes the usual hand operated lever 17 pivoted to the beam 10 at 18 and provided with the usual extension 19 having the laterally turned ends 20 to form a tread or foot piece so that the operator may use both his arm and leg for actuating this lever mechanism. This lever is associated with the usual toothed quadrant 21 attached to the beam 10 and is provided with the usual detent and actuating means for locking the lever in different positions on said quadrant. Also the lever 17 has an arm 22 to which is attached a link 23 also attached to the bars 14. The usual counter-balancing and shock absorbing springs 24 are employed.

With the exception of the castings 3 for the front ends of the beams 1 which have a slidable relation with the caster-axles 5, and the tie-bar 7 therebetween, the structure thus far described, with possible slight modifications, is not unlike structures now in general use, operating and functioning in a similar manner.

Referring now to the new and improved structure in listers affording the advantages hereinabove referred to, both said castings 3 are provided with flanged rollers 25 which operate in arcuate slots 26 of crank-levers 27, of the bell-crank type, each of which have a pivotal connection at 28 with an arm 29 from a casting 30 having a sleeve-like relation with the upper ends of the stems 4 of the caster-axles, permitting adjustable telescopic movement between the two such parts; such adjustment is obtained through the provision of adjusting screws 31 threaded through the upper ends of said castings and bearing against the upper ends of the stems 4 of said caster-axles, see Fig. 4. The castings 30 are connected by a tie-bar 32.

To the upper end of each crank-lever 27 is pivotally connected the forward end of a connecting rod 33, and said rods extend rearwardly toward the lever 17, and at the lever have an adjustable connection at 34, see Fig. 5, with a block 35, constituting an attachment member of a frame 36 associated with said lever 17. The connections at 34 between the rods 33 and the frames 36 may be used in assembly adjustment of the parts. The frames 36 include the blocks 35 at their forward ends and the blocks 37 at their rear ends, being connected by the upper and lower spaced straps or plates 38. Confined within each frame 36, between the straps or plates 38 and having a slidable relation therewith, is a block 39 and said block has a pivotal connection at 40 with the lifting lever 17. Having a rotating connection with each block 39 is the threaded end 41 of a hand operated crank-rod 42, the threaded portions of which pass through and have a threaded connection with the blocks 37, see Fig. 5. By rotating either or both of the crank-rods 42, first in one direction and then in another will result in a slidable relation being set up between either of the frames 36 and the lifting lever 17, resulting in either lengthening or shortening the distance between the crank-levers 27 and the pivotal points 40 between the frames 36 and said lever 17. The crank-levers 27 are each provided with a series of bolt openings 43, whereby an adjustable connection may be made between the rods 33 and said levers to provide for an assembly adjustment, or whenever such an adjustment seems desirable.

The purpose of the cranks 42 with their connections is merely to alter the suck of the plows by elevating or lowering the plow points, it being well known in the art that an exceedingly slight up or down movement of the plow point materially decreases or increases the suck thereof, and under actual working conditions the range of movement approximates between one-fourth to seven-sixteenths of an inch. Assuming that the point of the right hand plow bottom 2 is elevated or depressed to its maximum distance of seven-sixteenths of an inch, the movement is arcuate about the axis passing through the point of the left hand plow bottom and the left hand caster wheel 6. The point of the left hand plow bottom will have no vertical movement because it lies in the axis of the arcuate movement. It is apparent that the various points on the member 14 will have less and less of the vertical movement as they approach the left hand plow bottom. The movement in any of the bearings connecting the member 14 with the member 15 is thus exceedingly slight. It is also well known in the art that with the materials of which agricultural implements are made, it is possible to provide only bearings which are relatively loose, the clearance in the bearings approximating three-thirty seconds of an inch, which is standard practice in the art. A pivotal clearance of three-thirty seconds of an inch is ample for permitting the member 14 to swing through an arc of sufficient length to produce a range of movement of seven-sixteenths of an inch in the plow points.

It should be obvious from the foregoing description that the position of the castings 3 on the stems 4 of the caster-axles 3 may be raised or lowered to predetermined positions, and thus change the up and down positions of the forward ends of the plow beams 1, by screwing down or up the adjusting screws 31. Thus the angularity of the shares or bottoms 2 may be changed in relation to the surface of the ground and also the points or the heels of said shares or bottoms, as operating and ground conditions may require or be desirable. It should be further obvious that a pull or push on the rods 33 and the resulting oscillation of the crank-levers 27 will cause a lifting or lowering of the castings 3 on the stems 4 of the caster-axles 5 and a similar vertical body movement being imparted to the forward ends of the plow beams 1. Such movements being illustrated respectively, in Figures 2 and 3 of the drawings; the forward ends of the plow beams have a slight fulcrum movement on the axes of the front caster wheels 6. Furthermore, it should be obvious that by adjusting the threaded cranks 42 and thereby increasing or decreasing the distance between the crank-levers 27 and the pivotal points between the lifting lever 17 and either or both of the frames 36 that the shares or bottoms 2 may be adjusted independently of each other, or together, whereby to regulate them in their relation to the surface of the ground, and through the operation of the lever 17 raise and lower them in unison. It is to be understood that the independent adjustment of the shares or bottoms 2 through and by means of the threaded cranks 42 is possible when operating the lister in the field, as the cranks 42 are carried by the lifting lever 17 in reach of the operator from the seat 11; but adjustment of the adjusting screws 31 is only made possible by the operator going forward of the machine and with a suitable tool adjusting such screws.

It will be further understood, and it should be obvious from the description of the various elements included in the adjusting means and the lifting means that when the lever 17 is pulled toward the operator, in which position it is shown in Fig. 2, that the plow-beams 1 are lifted bodily at their front and rear ends, resulting in the shares or bottoms being raised in a substantially vertical or straight up position, so that the shares or bottoms are in substantially the same relative position to the horizontal surface of the ground, when out, as when in the ground. Such lifting at the rear ends of the beams is made possible through the elements 17, 22, 23 and 14 and at the front ends through the elements 33, 27, 26, 24 and 3, the latter elements having a slidable relation with the elements 4, as has been explained.

Fig. 2 shows the shares or bottoms raised above the ground, but not to their full extent, as the lever 17, as shown in such figure is capable of being moved further to the left, which, at its extreme movement would raise the shares or bottoms to substantially or approximately the position in which the dotted portion of the share or bottom is shown in Fig. 3. Such position is relatively higher than is ordinary in like machines and facilitates easy turning of the machine. The whole arrangement of parts makes easy the lifting of the bottoms, and entering into this is the roller connection between the crank-levers 27 and the castings 3, reducing all friction in these elements of the lift.

While the bottom, in Fig. 3, is shown lowered into operative position, the lever 17 is capable of still further forward movement, as is obvious from the position it bears in relation to the remainder of the forward portion of the quadrant, such additional movement is possible by the adjustment of the casting 3 on the stem 4 of the caster-axles, as it is believed will be understood. In the position of these parts, as illustrated in Fig. 3, the casting 3 is in its lowermost position, but by adjusting the casting 3 further upward on the stem 4, the lever 17 could be thrown further forward, thus further flexibility of the parts is permitted.

An advantage in having the bottoms in the same position relative to the surface of the ground, when out of the ground as when in the ground, is, that it makes the machine easier to set before going to the field, because the operator can then tell what his operating conditions will be like when the bottoms are in the ground; also the raising of the bottoms straight up or in a substantially vertical direction, rather than on a pivot at the front ends of the beams, makes the raising much easier, due to the lessening of the suction which arises when the beams are pivoted at their front ends.

Applicant has no knowledge that it has ever been possible in two-row listers to change the depth of one bottom, independently of the other bottom, while the lister is in motion, but by the novel means herein disclosed it is made possible to adjust the depth of one bottom very accurately, while the machine is in motion without affecting the depth of the other bottom. The adjusting screws 31 permit adjustments over a greater range than is provided for by the cranks 42. Also by this means of adjustment the castings 3 may be raised, in turn raising the plow beams without affecting the caster-wheels.

What we claim is:—

1. In a lister, in combination with supporting wheels and a frame structure, of a pair of implement carrying beams connected to the frame structure to be bodily lowered and raised and adapted for vertical adjustment at their forward ends whereby to adjust the implements in relation to each other and to ground conditions in which they are operated, an actuating means having connections with the beams for lowering and raising the beams bodily, and adjusting means associated with said actuating means and connecting means, whereby the forward ends of the beams may be adjusted vertically independently of each other or in unison and independently of the operation of said actuating means.

2. In a lister, in combination with supporting wheels and a frame structure, of a pair of plow carrying beams connected to the frame structure to be bodily lowered and raised and adapted for vertical adjustment at their forward ends whereby to adjust the plows in relation to each other and to ground conditions in which they are operated, a lever having connections with the plow beam for lowering and raising the beams bodily, and adjusting means associated with said lever and connecting means, whereby the forward ends of the plow beams may be adjusted vertically independently of each other or in unison and independently of the operation of said lever means.

3. In a lister, in combination with supporting wheels and a frame structure, of a pair of implement carrying beams connected to the frame structure to be bodily lowered and raised and adapted for vertical adjustment at their forward ends whereby to adjust the implements in relation to each other and to ground conditions in which they are operated, an actuating means and connections with the beams for lowering and raising the beams bodily, adjusting means associated with said actuating means and connecting means, whereby the forward ends of the beams may be adjusted vertically independently of each other or in unison and independently of the operation of said actuating means, and settable control means independent of said actuating and adjusting means and being associated with the beams for predeterminately controlling the extent of lowering and raising movement of said beams.

4. In a lister, in combination with supporting wheels and a frame structure, of a pair of plow carrying beams connected to the frame structure to be bodily lowered and raised and adapted for vertical adjustment at their forward ends whereby to adjust the plows in relation to each other and to ground conditions in which they are operated, a lever means and connections with the plow beams for lowering and raising the beams bodily, adjusting means associated with said lever and connecting means, whereby the forward ends of the plow beams may be adjusted vertically independently of each other or in unison and independently of the operation of said lever means, and settable control means independent of said actuating and adjusting means and being associated with the beams for predeterminately controlling the extent of lowering and raising movement of said beams.

5. In a lister, in combination with a wheeled supporting structure, implement carrying beams connected to the supporting structure to be bodily lowered and raised whereby to adjust the implements in relation to each other and to ground conditions in which the implements operate, actuating means having connections with the beams for lowering and raising the beams bodily, and adjusting means associated with said actuating means, whereby the beams may be adjusted vertically independently of each other and independently of the operation of said actuating means, whereby to control the relation of the implements to the ground conditions.

6. In a lister, in combination with a wheeled supporting structure, implement carrying beams connected to the supporting structure to be bodily lowered and raised whereby to adjust the implements in relation to each other and to ground conditions in which the implements operate, actuating means having connections with the beams for lowering and raising the beams bodily, adjusting means associated with said actuating means, whereby the beams may be adjusted vertically independently of each other and independently of the operation of said actuating means, whereby to control the relation of the implements to the ground conditions, and settable control means independent of said actuating and adjusting means and being associated with the beams for predeterminately controlling the extent of lowering and raising movement of said beams.

In witness whereof, we have hereunto affixed our hands this 9th day of September, 1926.

JAMES C. BRAND.
LEON W. CHASE.